No. 892,013. PATENTED JUNE 30, 1908.
H. SEVERIN.
APPARATUS FOR DRAWING OFF SMALL QUANTITIES OF MOLTEN GLASS
FROM GLASS FURNACES.
APPLICATION FILED MAR. 28, 1907.

Witnesses:

Inventor
Heinrich Severin
By
James L. Norris.
Atty

UNITED STATES PATENT OFFICE.

HEINRICH SEVERIN, OF ACHERN, GERMANY.

APPARATUS FOR DRAWING OFF SMALL QUANTITIES OF MOLTEN GLASS FROM GLASS-FURNACES.

No. 892,013.  Specification of Letters Patent.  Patented June 30, 1908.

Application filed March 28, 1907. Serial No. 365,166.

*To all whom it may concern:*

Be it known that I, HEINRICH SEVERIN, engineer, of Achern, Grand Duchy of Baden, German Empire, have invented new and useful Improvements in Apparatus for Drawing Off Small Quantities of Molten Glass from Glass-Furnaces, of which the following is a specification.

My invention relates to an apparatus for drawing off small quantities of molten glass from glass furnaces and is especially suitable for making hollow glass articles such as bottles and the like.

Within the melting furnace or a chamber thereof an intermediate receiver is arranged in such a manner that the glass directly enters the receiver from the furnace and is pressed out from the receiver through an outwardly extending channel into the receiving mold or the like. By causing the pressure to cease or by producing an under pressure in the receiver the flowing out of the glass may be stopped. The intermediate receiver in order to be easily taken out or substituted consists of a block provided with a hollow receiving space and being heated directly by the furnace gases.

Figure 1:
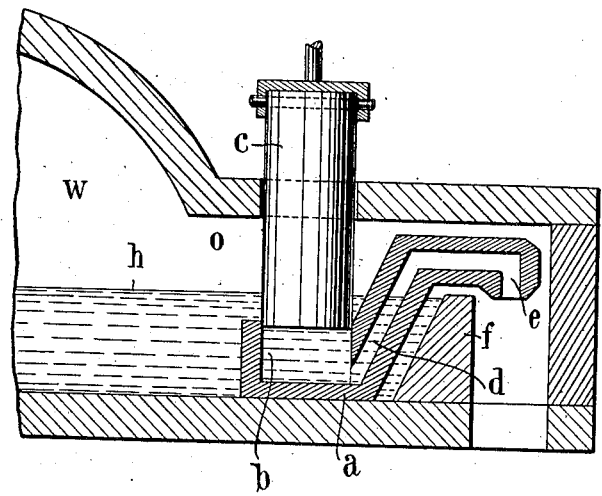
Figure 2:
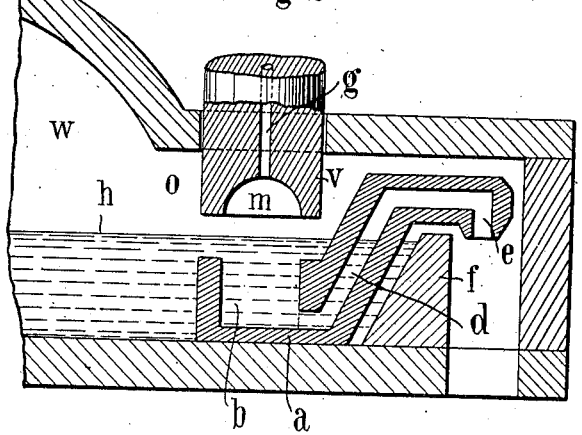

A suitable intermediate receiver and its associated parts is shown on the accompanying drawing, in which Figure 1 is a vertical section of a part of the melting furnace with a heating chamber for the arrangement of the intermediate receiver and its associate parts. Fig. 2 is a similar section of a modified form of construction.

Referring to Fig. 1, in the chamber $o$ of the melting furnace $w$ a wall $f$ of chamotte or any other fireproof material is put up which prevents the molten glass from flowing out of the furnace. Behind the wall $f$ a block $a$ is arranged, also consisting of a fireproof material, and which constitutes a receiver for the molten glass on its way from the furnace to the blowing or pressing machine or the like. Instead of arranging the receiver in a special chamber $o$, it may also be put into the furnace itself. At the end of the chamber $o$ is a wall $f^2$ which forms a discharge passage-way $d^2$ from the furnace intermediate the said latter wall and the wall $f$ to discharge the molten glass from said furnace through the medium of the receiver. It is apparent that the molten glass passing from the receiver $a$ is continuously heated by the gases in the furnace as said gases pass through the passage-way $d^2$ and act directly upon the molten glass discharged therethrough.

The receiver is open on the top for the inlet of the glass. From the bottom of the receiver $a$ an oblique channel extends upwardly provided with a turned down end $e$. In the hollow space $b$ of the receiver $a$ a plunger is arranged so as to be lifted or lowered. The rear wall of the intermediate receiver is of such a height or thus provided with an inlet opening that the glass may automatically flow into the hollow space of the receiver.

The action of this apparatus is as follows: If the plunger $c$ is sufficiently raised molten glass flows into the hollow space $b$ and fills it up. By lowering the plunger the glass in the hollow space $b$ is pressed through the ascending channel $d$ and the descending channel $e$ into the receiving mold or the like placed under the mouth of channel $e$. By stopping the movement of the plunger $c$ or by raising it again the flowing out of the glass is interrupted.

The chamber $o$ is in direct communication with the furnace so that the furnace gases play around all parts of the intermediate receiver and maintain them at the required temperature, so that the glass flows out of the channels $d$, $e$ in a perfect liquid state.

When working so-called pot furnaces a plunger is used which is lowered into the pot in order to cause regulated quantities of the glass to flow over a draw off pipe suitably arranged.

In the arrangement shown in Fig. 2 instead of a plunger $c$ a plunger $v$ is arranged having a larger sectional area than the hollow space $b$ and being provided with a bore $g$ connected to a pressure or suction pump (not shown). The hollow space $b$ of the intermediate receiver $a$ being filled with glass the plunger $v$ is lowered, until the spaces $b$ and $m$ are closed which latter is provided at the lower end of the plunger. Compressed air being introduced through bore $g$ to the space $b$ the glass contained therein is pressed out through the channels $d$, $e$. If the bore $g$ is connected to a suction pump or the pressure is ceased, the flowing out of the glass is interrupted.

The plunger shown in Fig. 1 may also be provided with a bore $g$ and a hollow space $m$, if the glass is to be pressed outwards by means of compressed air.

Having thus described my invention I declare that what I claim and desire to secure by Letters Patent is:

1. Means for removing glass from a glass furnace, comprising a removable intermediate receiver mounted in and immediately fed from the furnace and provided with an inlet for the material, a hollow space to receive the material and an outlet for the material, said receiver formed of a unitary structure and having its outlet positioned in the opening formed in the furnace for the introduction of the receiving mold or the like to be filled, and a pressure device operating through the wall of the furnace and adapted to close the inlet of the receiver and force the material from the receiver through the outlet of the latter.

2. Means for removing glass from a furnace comprising an intermediate receiver fed from the furnace and provided with a hollow space and an outlet, a plunger sliding in the wall of the furnace for closing said hollow space, said plunger provided with a bore for pressing air into or drawing it off from the hollow space of the receiver.

3. Means for taking glass from a glass furnace comprising an intermediate receiver immediately fed from the furnace and provided with an inlet, a hollow space, and an outlet for the glass, a pressure and suction device consisting of a plunger suitably sliding in the wall of the furnace and closing the hollow space of the intermediate receiver and being provided with a bore for pressing air into or drawing it off from the hollow space of the intermediate receiver.

In testimony whereof I have hereunto set my hand in presence of two subscribing witnesses.

HEINRICH SEVERIN.

Witnesses:
 Dr. Pax,
 Susi Pax